(12) United States Patent
Morgan

(10) Patent No.: US 11,086,341 B2
(45) Date of Patent: Aug. 10, 2021

(54) VARIABLE VENTURI ASSIST PRESSURE REGULATOR

(71) Applicant: Parker-Hannifin Corporation, Cleveland, OH (US)

(72) Inventor: Dan P. Morgan, Cleveland, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/760,158

(22) PCT Filed: Nov. 19, 2018

(86) PCT No.: PCT/US2018/061750
§ 371 (c)(1),
(2) Date: Apr. 29, 2020

(87) PCT Pub. No.: WO2019/108427
PCT Pub. Date: Jun. 6, 2019

(65) Prior Publication Data
US 2020/0326733 A1 Oct. 15, 2020

Related U.S. Application Data

(60) Provisional application No. 62/591,830, filed on Nov. 29, 2017.

(51) Int. Cl.
*G05D 16/02* (2006.01)
*G05D 16/06* (2006.01)
*F17C 13/04* (2006.01)

(52) U.S. Cl.
CPC ............. *G05D 16/02* (2013.01); *F17C 13/04* (2013.01); *G05D 16/0658* (2013.01); *F17C 2205/0382* (2013.01); *Y10T 137/7812* (2015.04)

(58) Field of Classification Search
CPC .......... Y10T 137/783; Y10T 137/7812; Y10T 137/7809; Y10T 137/782; Y10T 137/7831;
(Continued)

(56) References Cited

U.S. PATENT DOCUMENTS 847,944 A * 3/1907 Hubner et al. ..... G05D 16/0655
137/484.8
2,016,234 A * 10/1935 Hughes .............. G05D 16/0402
137/505.12
(Continued)

FOREIGN PATENT DOCUMENTS

EP 0 650 109 4/1995
EP 2 523 063 11/2012

OTHER PUBLICATIONS

International Search Report and Written Opinion issued by WIPO for corresponding International Patent Application No. PCT/US2018/061750 dated Apr. 25, 2019.

*Primary Examiner* — Jessica Cahill
(74) *Attorney, Agent, or Firm* — Renner, Otto, Boisselle & Sklar, LLP

(57) ABSTRACT

A pressure regulator includes a valve body that defines an inlet and an outlet for a fluid flow through the valve body, a poppet that is moveable within the valve body between an open position and a closed position to control the fluid flow from the inlet to the outlet, and a pressure regulating mechanism that controls a position of the poppet between the open and closed positions. The pressure regulating mechanism includes a diaphragm and a compression spring, and a force balance between the diaphragm and the compression spring determines the position of the poppet. The pressure regulating mechanism further includes a static (Continued)

pressure tap configured to apply a static pressure to the diaphragm, and a dynamic pressure tap configured to apply a dynamic pressure to the diaphragm. The dynamic pressure tap is located at an annular opening adjacent to the poppet, and an area of the annular opening varies with the position of the poppet to vary the dynamic pressure applied to the diaphragm.

6 Claims, 4 Drawing Sheets

(58) Field of Classification Search
CPC .......... Y10T 137/7804; G05D 16/0675; G05D 16/0691; G05D 16/0683; G05D 16/02; G05D 16/0658; G05D 16/0644; G05D 16/0655; G05D 16/0669; F17C 13/04; F17C 2205/0382

See application file for complete search history.

(56) References Cited

U.S. PATENT DOCUMENTS

| | | | | |
|---|---|---|---|---|
| 2,826,213 | A * | 3/1958 | Wright | G05D 16/0688 137/116.3 |
| 2,827,069 | A * | 3/1958 | Peterson | G05D 16/02 137/116.5 |
| 2,911,998 | A | 11/1959 | Drabik et al. | |
| 3,012,573 | A * | 12/1961 | Peterson | G05D 16/0683 137/505 |
| 3,601,148 | A * | 8/1971 | Jeffrey | G05D 16/0655 137/484.8 |
| 3,926,208 | A * | 12/1975 | Hoffman | G05D 16/107 137/484.8 |
| 4,195,656 | A * | 4/1980 | Kanerva | G05D 16/0688 137/458 |
| 5,755,254 | A | 5/1998 | Carter et al. | |
| 6,079,434 | A * | 6/2000 | Reid | G05D 16/0655 137/14 |
| 8,336,574 | B2 | 12/2012 | Kranz et al. | |
| 10,001,785 | B2 * | 6/2018 | Sanders | F16K 31/1266 |
| 10,247,320 | B2 * | 4/2019 | Zhou | F16K 17/30 |
| 2008/0257418 | A1 | 10/2008 | Kranz et al. | |

* cited by examiner

VARIABLE VENTURI ASSIST PRESSURE REGULATOR

RELATED APPLICATIONS

This application is a 35 U.S.C. § 371 national stage application of International Application No. PCT/US2018/061750 filed Nov. 19, 2018, which claims the benefit of U.S. Provisional Application No. 62/591,830 filed Nov. 29, 2017, the contents of which are incorporated herein by reference.

FIELD OF INVENTION

The present invention relates generally to pressure regulators, and more particularly to pressure regulators for natural gas and comparable gas delivery systems that operate at high flow rates.

BACKGROUND OF THE INVENTION

Pressure regulators are used to reduce and control a higher pressure inlet gas down to a usable pressure at the regulator outlet. This can be accomplished by sensing the outlet pressure with a flexible diaphragm or piston, which converts this pressure to a force based on the relationship: $F=P_{(outlet)} \times Area_{(effective)}$. This resultant force is then balanced with a compression spring. As the required flow rate increases, the outlet static pressure will drop. This reduces the force that balances that of the spring load. The position of the diaphragm will then move down, reducing the load from the spring, until a new force balance is established.

Conventional configurations of pressure regulators become deficient when low pressures with relatively high flows rates are employed. An example of such a system is a high flow natural gas delivery system commonly utilized in static engines. Natural gas deliverable systems in some applications are operable at inlet pressures as high as about 230 psig, although lower inlet pressure operations occur as well. For example, such systems may operate at flow rates on the order of 2500 L/min with correspondingly low inlet pressures of about 25 psig. A pressure regulator operating at a higher inlet pressure (e.g., about 230 psig) will exhibit less pressure drop in the static outlet pressure relative to flow because the regulator poppet does not stroke as far with high inlet pressure, and so the pressure drop due to the regulator spring load is less. However, with the higher flow rates at lower inlet pressures as referenced above (e.g., about 25 psig), the pressure drop in the static outlet pressure becomes unacceptable. For example, for engine natural gas delivery systems, the delivery outlet pressure typically should be about 5 psig, up to about 6 psig maximum. Under low inlet pressure conditions, however, conventional configurations commonly experience outlet static pressure drops to about 3 psig, below the desired outlet pressure that is useful for gas delivery at the requisite flow rates.

Accordingly, there exist applications operating at relatively low inlet pressures for which the drop in the outlet pressure relative to the flow is unacceptable. These applications require very low regulator outlet pressures, typically less than 6 psig and must provide a stable pressure as the flow demands climb to more than 2000 L/min of gas. The pressure drop experienced by current pressure regulators is unacceptable under these circumstances.

Prior attempts to address this issue have been deficient. Examples of prior attempted solutions include: pilot operated pressure regulators, which feed into the dome an external reference pressure to augment the spring force; electronic regulators, which open or close the valve seat in response to the readout of a pressure sensor; larger diaphragm regulators with linkages to help drive open the valve; and constant Venturi assisted regulators. These solutions are complex and costly. A pilot operated regulator requires a pilot pressure that is continuously increasing with increased flow, and then feeds that signal to the dome of the regulator. Electronic regulators need power, pressure sensors and a control system, which is a particularly costly approach. Large diaphragm linked regulators typically operate over a very narrow range of inlet pressures and are very costly. A constant Venturi assist scheme has been used in conjunction with a linkage driven regulator to provide a boost pressure. This may mitigate the outlet pressure drop at low inlet pressures, but will result in an undesirable pressure rise when operated at higher inlet pressures, and thus is unsuitable for many applications.

SUMMARY OF THE INVENTION

The present disclosure describes an enhanced pressure regulator configuration that eliminates the undesirable drop in outlet pressure relative to flow in a cost-effective manner as compared to conventional configurations, particularly at lower inlet pressures (e.g., around 25 psig). This is accomplished by advantageous placement of a dynamic pressure tap in an area of high flow around the valve poppet, in addition to the conventional static pressure tap. The addition of the dynamic pressure tap provides a variable Venturi assist to pressure regulation that self-adjusts depending upon the inlet pressure.

Generally, the pressure within a device as gas flows through the device is a combination of static and dynamic pressures, which is referred to as the total pressure. Accordingly, in a given local area, as the gas velocity increases, the dynamic pressure increases which must result in a decrease of the static pressure, as the total pressure remains constant. If this reduced static pressure is routed to the diaphragm, then the force balance of the regulator will be altered. In this manner, the local static pressure around the static pressure tap is at a lower pressure than the bulk outlet pressure as flow is increased. Using a conventional static pressure tap by itself leads to high pressure drop with increasing flow as described above, particularly in the presence of a relatively low inlet pressure. This undesirable pressure drop is eliminated by an advantageous placement of an additional dynamic pressure tap. When properly placed, the addition of such dynamic pressure tap results in a lower pressure at the static pressure tap with an increase in flow rate due to the conservation of energy. As the kinetic energy of the gas increases, the stored energy as static pressure will decrease to maintain the same total energy of the gas.

In exemplary embodiments, the dynamic pressure tap is located adjacent to the valve poppet where there is a high velocity flow. As the flow increases, the poppet stroke increases, and the poppet is shaped to reduce the area of an annular opening around the poppet in the vicinity of the dynamic pressure tap with increased stroke. Due to the Venturi effect, the reduced annular opening causes the velocity of the gas flowing past the dynamic pressure tap to increase, which decreases the pressure. The decreased pressure at the dynamic pressure tap will essentially pull the diaphragm open even as the outlet static pressure is maintained. Because the size of the annular opening, and thus the magnitude of the Venturi effect, varies with the poppet stroke, the positioning of the dynamic pressure tap provides for a variable Venturi assist to pressure regulation that self-adjusts depending upon the inlet pressure. The outlet pressure, therefore, is maintained even at low inlet pressures combined with high flow rates, as are common in natural gas delivery systems.

Such mechanism for maintaining the outlet pressure is more efficient than conventional configurations because the dynamic pressure tap is more effective at high poppet stroke which occurs at low inlet pressure, than at low poppet stroke which occurs at high inlet pressure. The result is a significant improvement in regulator performance without a significant increase in cost and complexity.

An aspect of the invention, therefore, is a pressure regulator that has an advantageously placed dynamic pressure tap in combination with a typical static pressure tap to utilize a variable Venturi effect to eliminate undesirable pressure drop at relatively low inlet pressures with high flow rates. In exemplary embodiments, the pressure regulator includes a valve body that defines an inlet and an outlet for a fluid flow through the valve body, a poppet that is moveable within the valve body between an open position and a closed position to control the fluid flow from the inlet to the outlet, and a pressure regulating mechanism that controls a position of the poppet between the open position and the closed position. The pressure regulating mechanism includes a diaphragm and a compression spring, and a force balance between the diaphragm and the compression spring determines the position of the poppet. The pressure regulating mechanism further includes a static pressure tap that is configured to apply a static pressure to the diaphragm, and a dynamic pressure tap that is configured to apply a dynamic pressure to the diaphragm. The dynamic pressure tap is located at an annular opening adjacent to the poppet, and an area of the annular opening varies with the position of the poppet to vary the dynamic pressure applied to the diaphragm.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
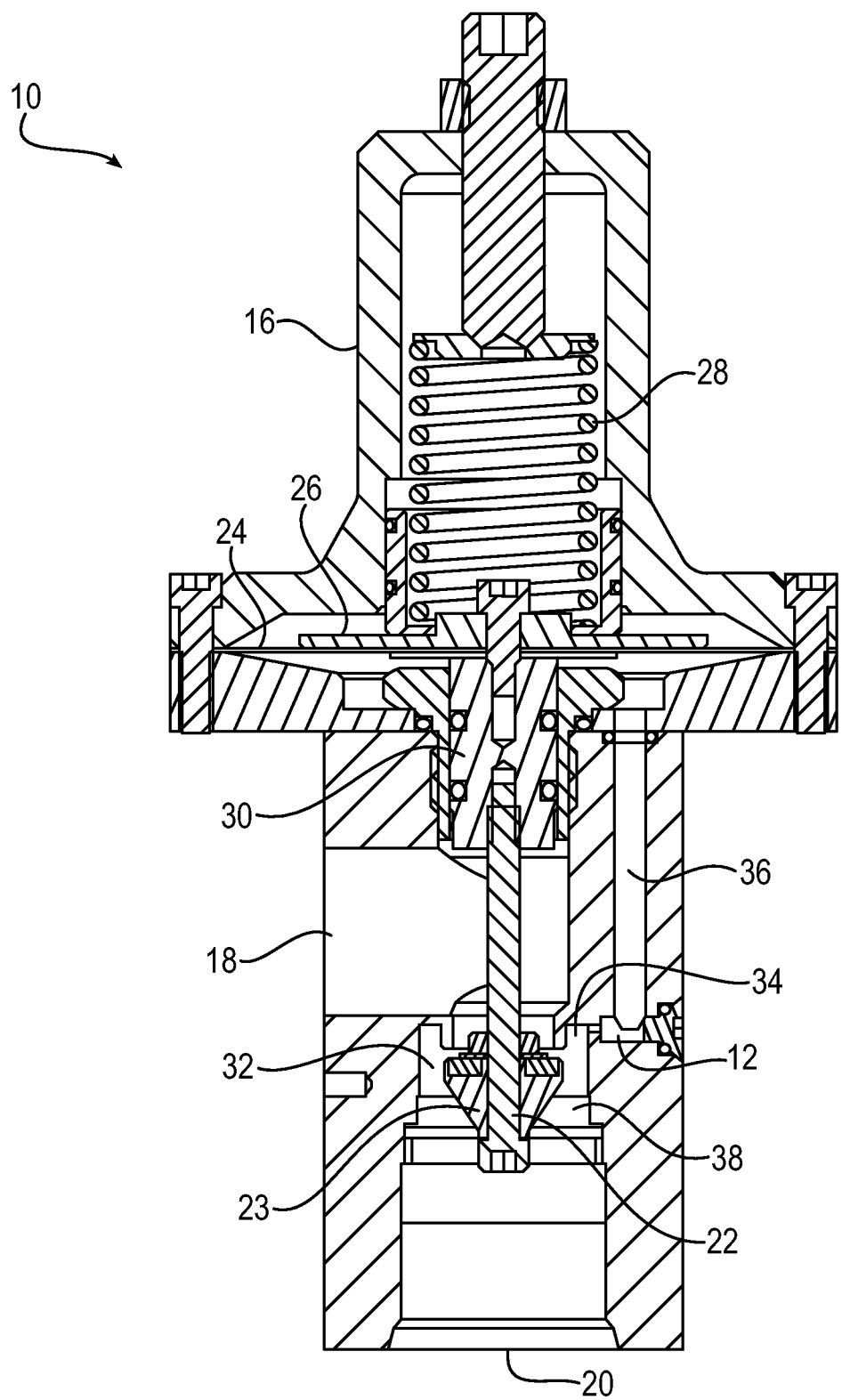
FIG. 1 is a drawing depicting a cross-sectional view of an exemplary pressure regulator in accordance with embodiments of the present invention, the cross-section being in a first plane to illustrate a location of a static pressure tap.

Embodiments of the present invention will now be described with reference to the drawings, wherein like reference numerals are used to refer to like elements throughout. It will be understood that the figures are not necessarily to scale.

The present disclosure describes an enhanced pressure regulator configuration that eliminates the undesirable drop in outlet pressure relative to flow in a cost-effective manner as compared to conventional configurations. The pressure regulator configuration in particular eliminates undesirable pressure drop experienced by conventional configurations for applications that employ low inlet pressure with relatively high flow rates, such as in the natural gas delivery systems described above. Performance is improved by the addition of a dynamic pressure tap, which is positioned to provide a variable Venturi assist to pressure regulation that self-adjusts depending upon the inlet pressure.

Generally, the pressure within a device as gas flows through the device is a combination of static and dynamic pressures, which is referred to as the total pressure. Total pressure is given by:

$$P_{total} = \text{constant} = P_{Dyn} + P_{static} = \tfrac{1}{2}pv^2 + P_{static}$$

Where: $P_{Dyn}$=dynamic pressure
p=density
v=velocity
$P_{static}$=static pressure Accordingly, as is known in the art, in a given local area as the gas velocity increases, the dynamic pressure increases which must result in a decrease of the static pressure as the total pressure remains constant. Such pressure operation occurs due to the Venturi effect. The addition of an advantageously placed dynamic pressure tap in combination with a typical static pressure tap utilizes operation of a variable Venturi effect to eliminate the undesirable pressure drop experienced in conventional configurations.

Figure 2:
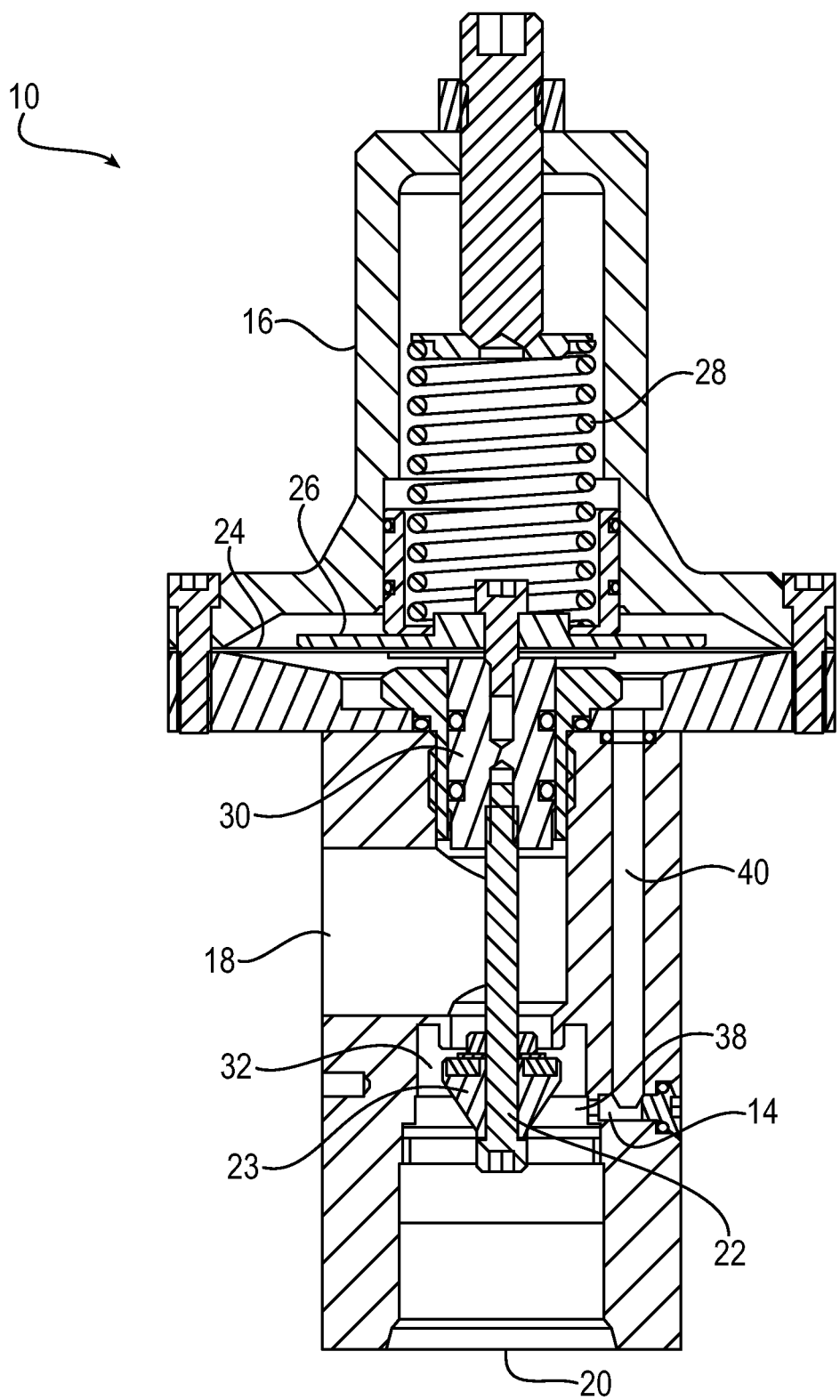
FIG. 2 is a drawing depicting a cross-sectional view of the exemplary pressure regulator of FIG. 1, the cross-section being in a second plane to illustrate a location of a dynamic pressure tap.

FIG. 1 is a drawing depicting a cross-sectional view of an exemplary pressure regulator 10, the cross-section being in a first plane to illustrate a location of a static pressure tap 12. FIG. 2 is a drawing depicting a cross-sectional view of the exemplary pressure regulator 10 of FIG. 1, the cross-section being in a second plane to illustrate a location of a dynamic pressure tap 14. The pressure regulator 10 includes a valve body 16 that defines an inlet 18 and an outlet 20 for a fluid flow through the valve body, such as natural gas for example.

Generally for gas delivery, it is desirable that the inlet pressure be higher than the outlet pressure, as the inlet pressure is more suitable for bulk transport, whereas the outlet pressure is more suitable for usage. Accordingly, the valve assembly 10 employs a pressure regulating mechanism that converts the inlet pressure to the outlet pressure. Fluid flow from the inlet to the outlet is controlled by the position of a poppet 22 that is moveable between an open position and a closed position. The pressure regulating mechanism controls a position of the poppet 22 between the open position and the closed position. The pressure regulating mechanism includes a flexible diaphragm 24 and a compression spring 28, and a force balance between the diaphragm and the compression spring determines the position of the poppet. More particularly, the outlet pressure is regulated by sensing the outlet pressure with the flexible diaphragm 24, which converts this pressure to a force based on the relationship: $F=P_{(outlet)} \times Area_{(effective)}$. The diaphragm 24 is supported by a diaphragm plate 26, which is linked to the compression spring 28. The resultant force of the diaphragm in accordance with the above force relationship is therefore balanced by the spring load of the compression spring 28, and the position of the diaphragm 24 relative to the compression spring 28 establishes such force balance to position the poppet to achieve the desired conversion of inlet pressure to outlet pressure. The spring load is transmitted to the poppet 22 through a linkage mechanism 30 to properly position the poppet to achieve the desired outlet pressure and flow.

During operation of the pressure regulator 10, if no fluid is flowing through the assembly, the poppet 22 will be biased in the open position by the spring load, the direction of which is shown in FIG. 1. When fluid is directed into the pressure regulator 10, fluid flows through the inlet 18 and into an internal cavity 32 adjacent to the poppet. Pressure builds within the cavity 32, and the poppet 22 is moved to the closed position. When a downstream valve is opened allowing the fluid to exit the pressure regulator 10 through the outlet 20, the pressure within the cavity 32 drops allowing the poppet 22 to move toward the open position. The drop in pressure pulls the diaphragm down, and ultimately a force balance is achieved with the spring load of the compression spring 28 to control the flow through the pressure regulator.

Generally, an aspect of the invention is a pressure regulator that has an advantageously placed dynamic pressure tap in combination with a typical static pressure tap to utilize a variable Venturi effect to eliminate undesirable pressure drop at relatively low inlet pressures with high flow rates. In exemplary embodiments, the pressure regulator includes a valve body that defines an inlet and an outlet for a fluid flow through the valve body, a poppet that is moveable within the valve body between an open position and a closed position to control the fluid flow from the inlet to the outlet, and a pressure regulating mechanism that controls a position of the poppet between the open position and the closed position. The pressure regulating mechanism includes a diaphragm and a compression spring, and a force balance between the diaphragm and the compression spring determines the position of the poppet. The pressure regulating mechanism further includes a static pressure tap that is configured to apply a static pressure to the diaphragm, and a dynamic pressure tap that is configured to apply a dynamic pressure to the diaphragm. The dynamic pressure tap is located at an annular opening adjacent to the poppet, and an area of the annular opening varies with the position of the poppet to vary the dynamic pressure applied to the diaphragm.

As referenced above, FIG. 1 illustrates a cross-section in a first plane to illustrate a location of the static pressure tap 12. The static pressure tap 12 is located in fluid communication with a low flow area 34 to transfer a static pressure through a fluid pathway 36 to the diaphragm 24. This essentially provides a static pressure sensing signal to the diaphragm 24. As described above, conventional configurations utilize such a static pressure tap to apply pressure to the diaphragm for pressure sensing to achieve the force balance with the spring, and in turn the outlet pressure. Again, however, use of the static pressure tap alone results in an undesirably large pressure drop experienced in applications that employ low inlet pressures with relatively high flow rates, such as in natural gas delivery systems. To overcome such deficiency, the pressure regulating mechanism of the pressure regulator 10 further employs the dynamic pressure tap 14, as shown in FIG. 2.

As is known in the art, in a given local area as the gas velocity increases, the dynamic pressure increases which must result in a decrease of the static pressure as the total pressure remains constant. If this reduced static pressure is routed to the diaphragm as done in conventional configurations, then the force balance of the regulator will be altered. In this manner, the local static pressure around the static pressure tap is at a lower pressure than the bulk outlet pressure as flow is increased. Using a conventional static pressure tap by itself leads to a high pressure drop with increasing flow as described above. This undesirable pressure drop is eliminated by advantageous placement of the additional dynamic pressure tap 14. When properly placed, the addition of such dynamic pressure tap results in a lower pressure at the static pressure tap with an increase in flow rate due to the conservation of energy. As the kinetic energy of the gas increases, the stored energy as static pressure will decrease to maintain the same total energy of the gas.

As referenced above, FIG. 2 illustrates a cross-section of the pressure regulator 10 in a second plane to illustrate a location of the dynamic static pressure tap 14. The dynamic pressure tap 14 is located in fluid communication with a high flow annular area 38 of the cavity 32, which is around or in the vicinity of the poppet 22, to transfer a dynamic pressure through a fluid pathway 40 to the diaphragm 24. This essentially provides a dynamic pressure sensing signal to the diaphragm 24. Comparing FIG. 1 showing the static pressure tap 12 to FIG. 2 showing the dynamic pressure tap 14, fluid flow through the annular opening 38 at the dynamic pressure tap is a high flow area relative to a low flow area at which the static pressure tap 12 is located. For positioning the different pressure taps in high flow versus low flow areas, the static pressure tap 12 is spaced farther apart from the poppet 22 relative to the dynamic pressure tap 14 to locate the static pressure tap 12 at the low flow area.

In exemplary embodiments, the poppet has a wedge shaped end 23 having inclined sides. Generally, the dynamic pressure tap 14 is positioned relative to the poppet 22 such that an area of the high flow annular area 38 adjacent to the dynamic pressure tap 14 is dependent upon the position of the poppet 22 because of such wedge shape. In this manner, the wedge shaped end operates to vary the area of the annular opening based on the position of the poppet.

Figure 3:
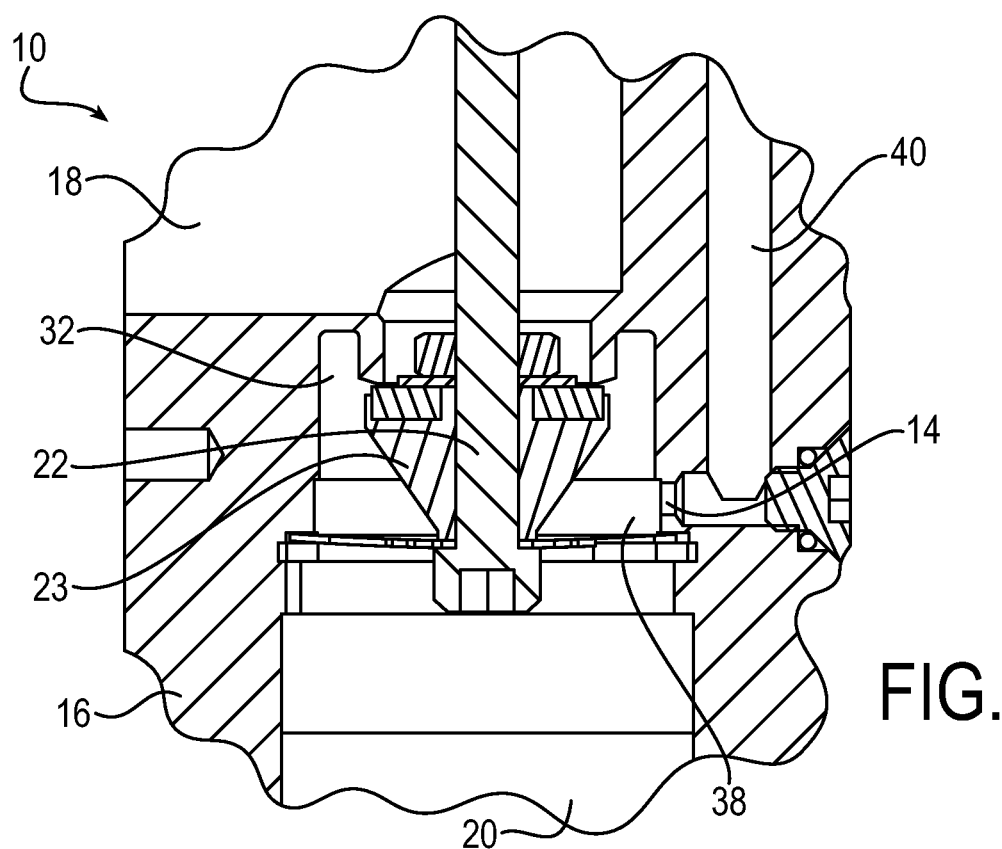
FIG. 3 is a drawing depicting a close-up view of a portion of the pressure regulator to illustrate the dynamic pressure tap under conditions of high inlet pressure, high flow rate.

FIG. 3 is a drawing depicting a close-up view of a portion of the pressure regulator 10 to illustrate the dynamic pressure tap 14 under conditions of high inlet pressure (e.g., up to about 230 psig) and high flow rate. At high inlet pressure, high flow rate, very little poppet stroke is required to achieve the flow rate, and the poppet 22 is positioned toward the closed position. The annular area 38 constitutes a relatively large annular opening at the dynamic pressure tap. This results in a reduced or minimal Venturi effect in the presence of high inlet pressure. As a result, the dynamic pressure contribution to the diaphragm is minimal, and as the total pressure remains constant, the pressure sensed at the diaphragm is approximated by the pressure at the static pressure tap 12. Under conditions of high inlet pressure and high flow rate, therefore, the pressure regulator 10 operates similarly as conventional configurations that employ only a static pressure tap.

Figure 4:
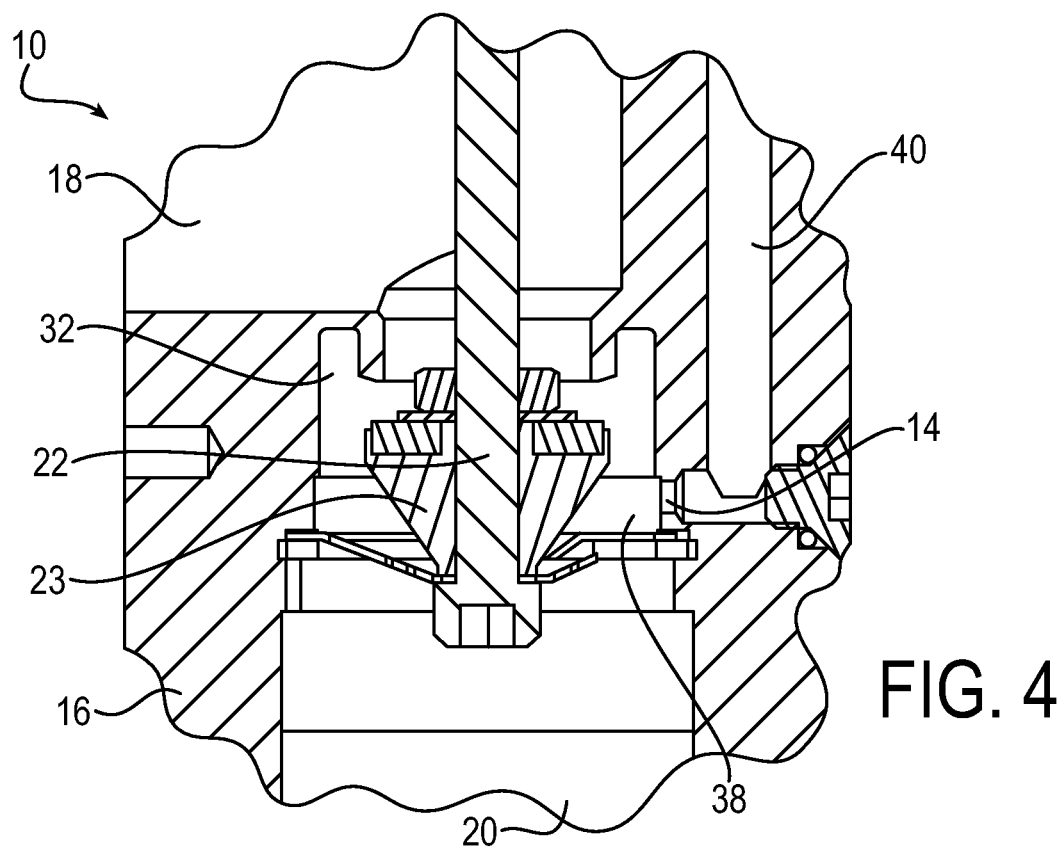
FIG. 4 is a drawing depicting a close-up view of a portion of the pressure regulator to illustrate the dynamic pressure tap under conditions of low inlet pressure, high flow rate.

The operation changes when there is low inlet pressure (e.g., down to about 25 psig) with a high flow rate. FIG. 4 is a drawing depicting a close-up view of the portion of the pressure regulator to illustrate the dynamic pressure tap under conditions of low inlet pressure and high flow rate. At low inlet pressure, high flow rate, a larger poppet stroke (up to maximum poppet stroke) is required to achieve the flow rate, and the poppet 22 is positioned toward the open position. Due to the wedge shaped end 23 of the poppet 22, the position of the poppet during low inlet pressure reduces the annular opening 38 at the dynamic pressure tap 14. This results in an increased Venturi effect in the presence of low inlet pressure. As a result, the dynamic pressure contribution to the diaphragm also is increased up to maximum with maximum poppet stroke, and as the total pressure remains constant, the contribution to the pressure sensed at the diaphragm from the static pressure tap 12 is minimized.

Between maximum and minimum inlet pressures, the dynamic pressure tap based on the poppet position self-adjusts to provide a variable Venturi effect to provide suitable operation through the entire range of inlet pressure. The position of the poppet thus varies based on inlet pressure such that the area of the annular opening decreases as the inlet pressure decreases. In other words, the poppet stroke increases as the inlet pressure decreases to decrease the area of the annular opening as the inlet pressure decreases. The dynamic pressure tap 14, therefore, provides a variable Venturi assist operation of the pressure regulator. The position of the poppet is dependent upon the inlet pressure, which in turn varies the area of the annular opening 38 at the dynamic pressure tap 14 due to the wedge shaped end of the poppet. As such area varies, the level of the Venturi effect varies, and thus the assistance of the dynamic pressure tap in pressure regulation varies in turn.

The control using the dynamic pressure tap differs significantly from conventional configurations. The location of the dynamic pressure tap is such that at high inlet pressure corresponding to low stroke of the poppet, the flow area of the annular area adjacent to the dynamic pressure tap is relatively large and the pressure contribution of the dynamic pressure tap is minimized. At high inlet pressure, assistance from the dynamic pressure tap is not required because the poppet stroke is so low that there is very little pressure drop. In contrast, at low inlet pressure the poppet must stroke further open to satisfy the flow demand. This decreases the flow area of the annular opening adjacent to the dynamic pressure tap, which increases the assistance of the dynamic pressure tap in regulating the pressure. The reduced annular opening causes the velocity of the gas flowing past the dynamic pressure tap to increase, which decreases the pressure at the annular opening. The decreased pressure at the dynamic pressure tap will essentially pull the diaphragm more open even as the outlet static pressure is maintained. Such mechanism for maintaining the outlet pressure is more efficient than conventional configurations because the dynamic pressure tap is more effective at high poppet stroke which occurs at low inlet pressure, than at low poppet stroke which occurs at high inlet pressure. The result is a significant improvement in regulator performance without a significant increase in cost and complexity.

Figure 5:
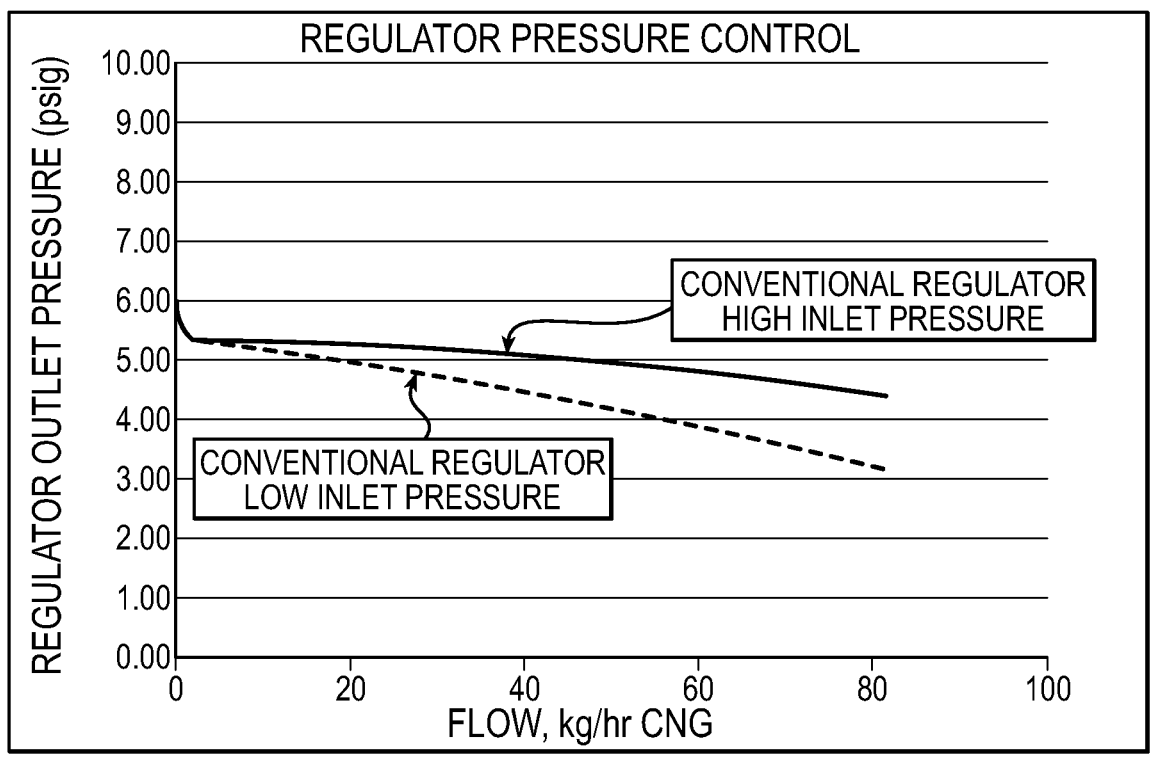
FIG. 5 is a graph depicting an example of regulator outlet pressure as a function of flow rate for a conventional pressure regulator that employs only a static pressure tap.
Figure 6:
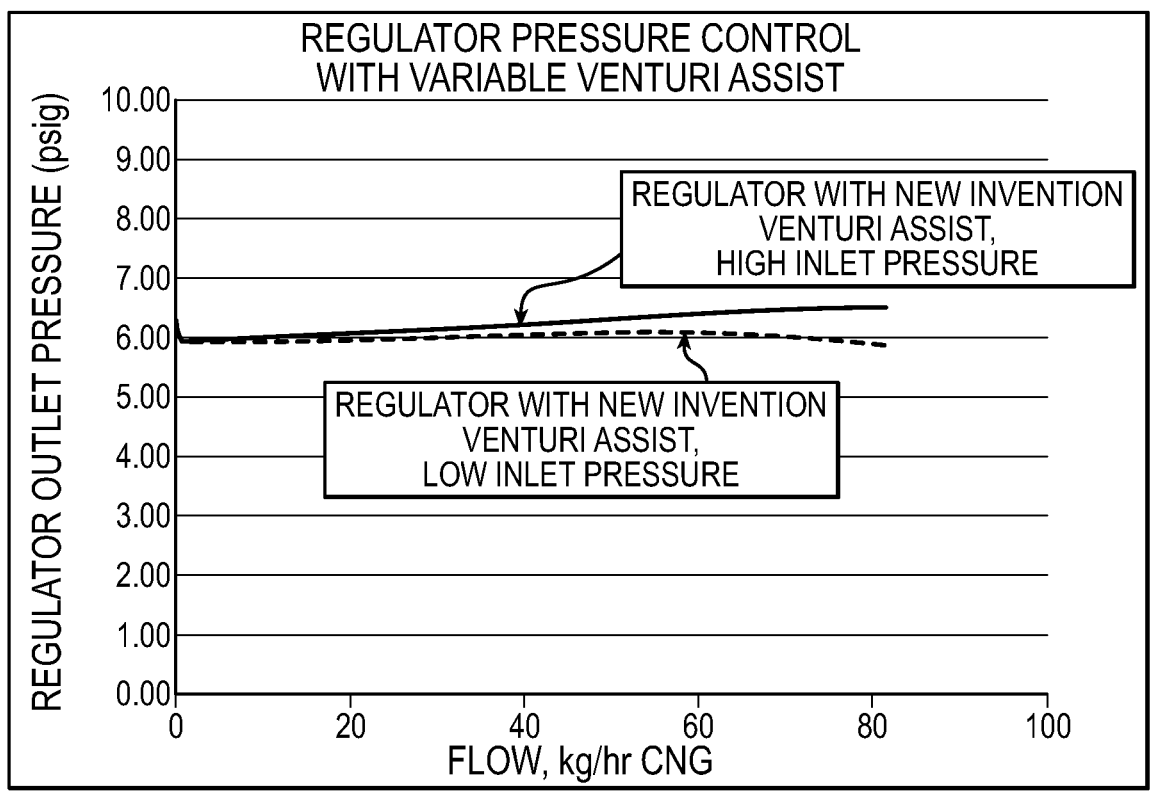
FIG. 6 is a graph depicting an example of regulator outlet pressure as a function of flow rate for a pressure regulator that employs a dynamic pressure tap in accordance with embodiments of the present invention.

The enhanced performance of the pressure regulator 10 is illustrated by FIGS. 5 and 6. FIG. 5 is a graph depicting an example of regulator outlet pressure as a function of flow rate for a conventional pressure regulator that employs only a static pressure tap. The example is applicable to exemplary natural gas delivery systems. Under operation at high inlet pressure, the conventional pressure regulator experiences a small pressure drop at the outlet pressure, but generally the outlet pressure is sustained at a usable level. Such is not the case under operation at low inlet pressure. Rather, the outlet pressure falls below 4 psig to about 3 psig at higher flow rates that may be employed, which results in inadequate performance. The conventional configuration, therefore, is deficient for low inlet pressure at high flow rates that may be used in natural gas delivery systems.

In contrast, FIG. 6 is a graph depicting a comparable example of regulator outlet pressure as a function of flow rate for a pressure regulator that employs a dynamic pressure tap that is advantageously positioned in accordance with embodiments of the present invention. With the variable Venturi assist of the dynamic pressure tap, the outlet pressure is maintained largely constant, and at a useful level, for conditions of both high inlet pressure and low inlet pressure across the full range of typical flow rates, and at the higher end flow rates in particular. The pressure regulator of the present disclosure, therefore, achieves enhanced results as compared to conventional configurations.

An aspect of the invention, therefore, is a pressure regulator that has an advantageously placed dynamic pressure tap in combination with a typical static pressure tap to utilize a variable Venturi effect to eliminate undesirable pressure drop at relatively low inlet pressures with high flow rates. In exemplary embodiments, the pressure regulator includes a valve body that defines an inlet and an outlet for a fluid flow through the valve body; a poppet that is moveable within the valve body between an open position and a closed position to control the fluid flow from the inlet to the outlet; and a pressure regulating mechanism that controls a position of the poppet between the open position and the closed position, the pressure regulating mechanism comprising a diaphragm and a compression spring and a force balance between the diaphragm and the compression spring determines the position of the poppet. The pressure regulating mechanism further comprises a static pressure tap that is configured to apply a static pressure to the diaphragm, and a dynamic pressure tap that is configured to apply a dynamic pressure to the diaphragm. The dynamic pressure tap is located at an annular opening adjacent to the poppet, and an area of the annular opening varies with the position of the poppet to vary the dynamic pressure applied to the diaphragm. The pressure regulator may include one or more of the following features, either individually or in combination.

In an exemplary embodiment of the pressure regulator, the fluid flow through the annular opening at the dynamic pressure tap is a high flow area relative to a low flow area at which the static pressure tap is located.

In an exemplary embodiment of the pressure regulator, the static pressure tap is spaced farther apart from the poppet relative to the dynamic pressure tap to locate the static pressure tap at the low flow area.

In an exemplary embodiment of the pressure regulator, the poppet has a wedge shaped end to vary the area of the annular opening based on the position of the poppet.

In an exemplary embodiment of the pressure regulator, the position of the poppet varies based on inlet pressure such that the area of the annular opening decreases as the inlet pressure decreases.

In an exemplary embodiment of the pressure regulator, the poppet stroke increases as the inlet pressure decreases to decrease the area of the annular opening as the inlet pressure decreases.

In an exemplary embodiment of the pressure regulator, the compression spring biases the poppet toward the open position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure regulator comprising:
   a valve body that defines an inlet and an outlet for a fluid flow through the valve body;
   a poppet that is moveable within the valve body between an open position and a closed position to control the fluid flow from the inlet to the outlet;
   a pressure regulating mechanism that controls a position of the poppet between the open position and the closed position, the pressure regulating mechanism comprising a diaphragm and a compression spring and a force balance between the diaphragm and the compression spring determines the position of the poppet; and
   the pressure regulating mechanism further comprises a static pressure tap that is configured to apply a static pressure to the diaphragm, and a dynamic pressure tap that is configured to apply a dynamic pressure to the diaphragm;
   wherein the static pressure tap is located in fluid communication with a low flow area to transfer a static pressure through a first fluid pathway to the diaphragm to apply the static pressure to the diaphragm;
   wherein the dynamic pressure tap is located in fluid communication with a high flow annular area to transfer a dynamic pressure through a second fluid pathway to the diaphragm to apply the dynamic pressure to the diaphragm, wherein the high flow annular area has a flow that is higher than flow at the low flow area;
   and an area of the annular opening varies with the position of the poppet to vary the dynamic pressure applied to the diaphragm; and
   wherein as an inlet pressure at the inlet decreases, the dynamic pressure applied by the dynamic pressure tap to the diaphragm increases thereby decreasing the static pressure applied by the static pressure tap to the diaphragm.

2. The pressure regulator of claim 1, wherein the static pressure tap is spaced farther apart from the poppet relative to the dynamic pressure tap to locate the static pressure tap at the low flow area.

3. The pressure regulator of claim 1, wherein the poppet has a wedge shaped end to vary the area of the annular opening based on the position of the poppet.

4. The pressure regulator of claim 1, wherein the position of the poppet varies based on inlet pressure such that the area of the annular opening decreases as the inlet pressure decreases.

5. The pressure regulator of claim 1, wherein the poppet stroke increases as the inlet pressure decreases to decrease the area of the annular opening as the inlet pressure decreases.

6. The pressure regulator of claim 1, wherein the compression spring biases the poppet toward the open position.

* * * * *